United States Patent
Smith et al.

(10) Patent No.: US 9,739,155 B2
(45) Date of Patent: Aug. 22, 2017

(54) STRUCTURAL CONFIGURATIONS AND COOLING CIRCUITS IN TURBINE BLADES

(71) Applicant: General Electric Company, Schenectady, NY (US)

(72) Inventors: Aaron Ezekiel Smith, Simpsonville, SC (US); Lisa Anne Wichmann, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 713 days.

(21) Appl. No.: 14/143,537

(22) Filed: Dec. 30, 2013

(65) Prior Publication Data
US 2015/0184525 A1 Jul. 2, 2015

(51) Int. Cl.
*F01D 5/08* (2006.01)
*F01D 5/18* (2006.01)

(52) U.S. Cl.
CPC ............. *F01D 5/188* (2013.01); *F01D 5/187* (2013.01); *F05D 2240/305* (2013.01); *F05D 2240/306* (2013.01); *F05D 2250/71* (2013.01); *F05D 2250/711* (2013.01); *F05D 2250/712* (2013.01); *F05D 2250/713* (2013.01); *F05D 2250/75* (2013.01); *F05D 2260/201* (2013.01); *F05D 2260/202* (2013.01); *F05D 2260/2212* (2013.01); *F05D 2260/22141* (2013.01); *Y02T 50/676* (2013.01)

(58) Field of Classification Search
CPC ................................. F01D 5/187; F01D 5/188
See application file for complete search history.

(56) References Cited

U.S. PATENT DOCUMENTS

| 4,627,480 | A  | * | 12/1986 | Lee ........................... B22C 9/04 164/122.1 |
| 5,395,212 | A  | * | 3/1995  | Anzai ..................... F01D 5/187 415/115 |
| 7,094,031 | B2 | * | 8/2006  | Lee .......................... F01D 5/187 416/97 R |
| 7,114,916 | B2 |   | 10/2006 | Dube et al. |
| 7,347,671 | B2 |   | 3/2008  | Dorling et al. |
| 7,637,720 | B1 |   | 12/2009 | Liang |
| 7,775,053 | B2 |   | 8/2010  | Joe et al. |
| 7,901,180 | B2 |   | 3/2011  | Abdel-Messeh et al. |
| 8,210,812 | B2 |   | 7/2012  | Abdel-Messeh et al. |
| 8,376,706 | B2 |   | 2/2013  | Bunker et al. |
| 8,535,004 | B2 | * | 9/2013  | Campbell ............... F01D 5/148 415/115 |

* cited by examiner

*Primary Examiner* — Gregory Anderson
*Assistant Examiner* — Jason Fountain
(74) *Attorney, Agent, or Firm* — Mark E. Henderson; Ernest G. Cusick; Frank A. Landgraff (57) ABSTRACT

A turbine blade that includes an airfoil defined by a concave shaped pressure side outer wall and a convex shaped suction side outer wall that connect along leading and trailing edges and, therebetween, form a radially extending chamber for receiving the flow of a coolant. The turbine blade further may include a rib configuration that partitions the chamber of the airfoil into radially extending flow passages. A first flow passage may include a first side on which turbulators are positioned, wherein each of the turbulators comprises a canted configuration.

16 Claims, 11 Drawing Sheets

STRUCTURAL CONFIGURATIONS AND COOLING CIRCUITS IN TURBINE BLADES

BACKGROUND OF THE INVENTION

This invention relates to turbine airfoils, and more particularly to hollow turbine airfoils, such as rotor or stator blades, having internal channels for passing fluids such as air to cool the airfoils.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passageways or circuits that form a cooling system through which a coolant, typically air bled from the compressor, is circulated. Such cooling circuits are typically formed by internal ribs that provide the required structural support for the airfoil, and include multiple flow paths designed to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable turbine blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil designs that offer internal airfoil configurations and coolant circulation that improves coolant efficiency.

A consideration that further complicates design of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passageways defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement, however, the outer walls experience a significantly greater level of thermal expansion than the inner walls. This imbalanced growth causes stress to develop at the points at which the inner ribs and outer walls connect, which may cause low cyclic fatigue that can shorten the life of the blade. As such, the development of airfoil structures that use coolant more efficiently while also reducing stress caused by imbalanced thermal expansion between internal and external regions remains a significant technological industry objection.

BRIEF DESCRIPTION OF THE INVENTION

The present application thus describes a turbine blade that includes an airfoil defined by a concave shaped pressure side outer wall and a convex shaped suction side outer wall that connect along leading and trailing edges and, therebetween, form a radially extending chamber for receiving the flow of a coolant. The turbine blade further may include a rib configuration that partitions the chamber of the airfoil into radially extending flow passages. A first flow passage may include a first side on which turbulators are positioned, wherein each of the turbulators comprises a canted configuration.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

As an initial matter, in order to clearly describe the current invention it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part. Accordingly, in understanding the scope of the present invention, attention should not only be paid to the terminology and description provided herein, but also to the structure, configuration, function, and/or usage of the component.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

By way of background, referring now to the figures, FIGS. 1 through 4 illustrate an exemplary combustion turbine engine in which embodiments of the present application may be used. It will be understood by those skilled in the art that the present invention is not limited to this particular type of usage. The present invention may be used in combustion turbine engines, such as those used in power generation, airplanes, as well as other engine types. The examples provided are not meant to be limiting unless otherwise stated.

Figure 1:
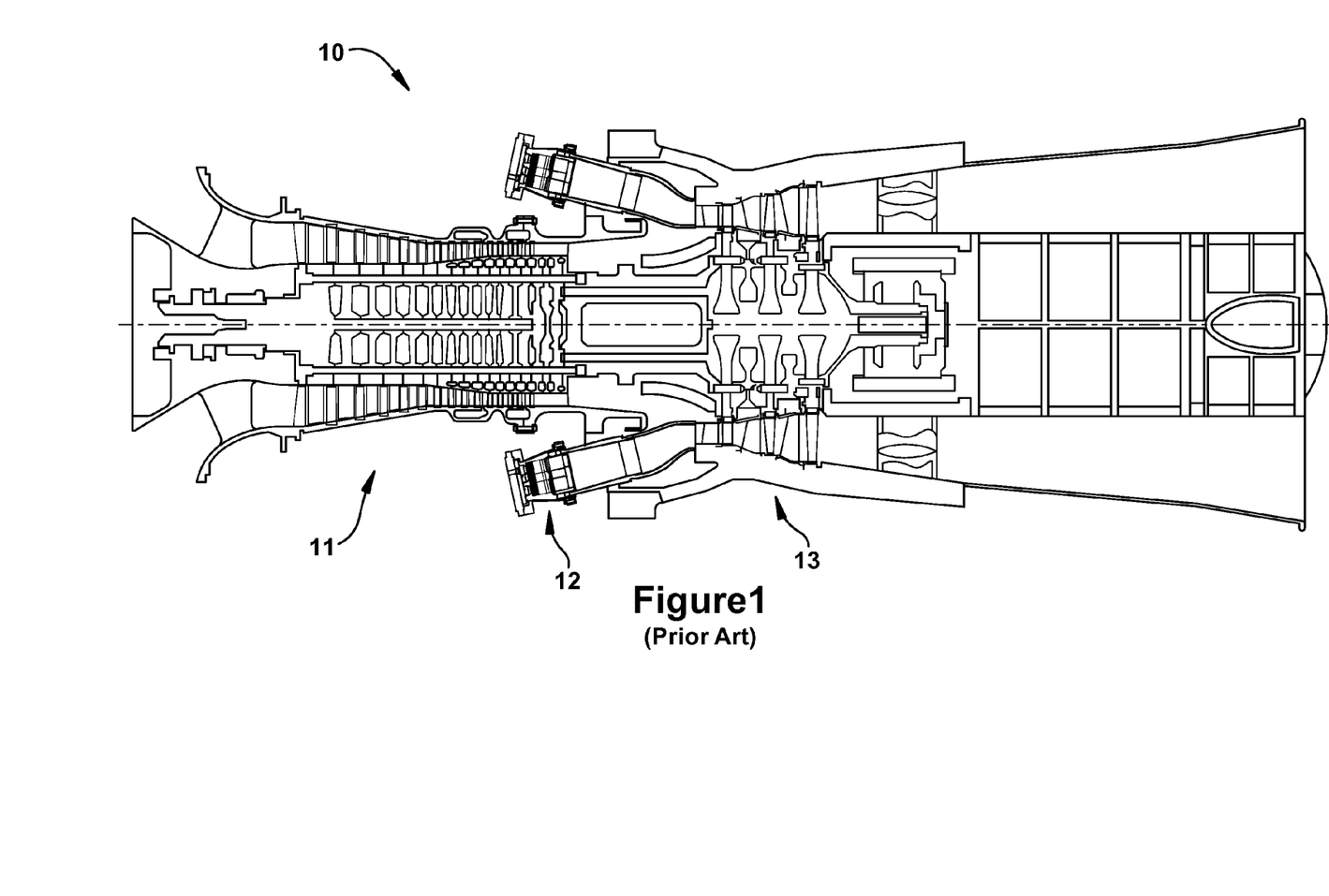
FIG. 1 is a schematic representation of an exemplary turbine engine in which certain embodiments of the present application may be used.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between the compressor 11 and the turbine 13.

Figure 2:
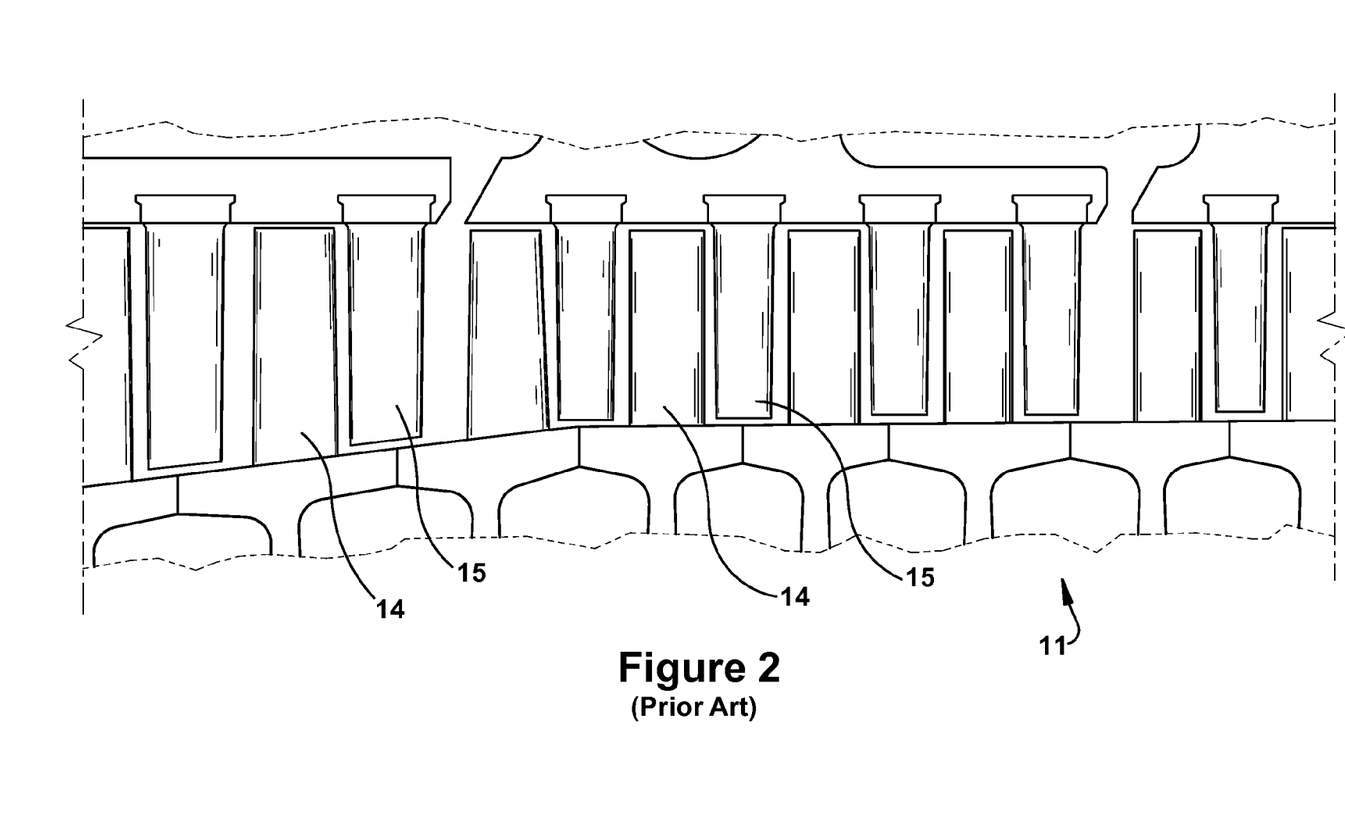
FIG. 2 is a sectional view of the compressor section of the combustion turbine engine of FIG. 1.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
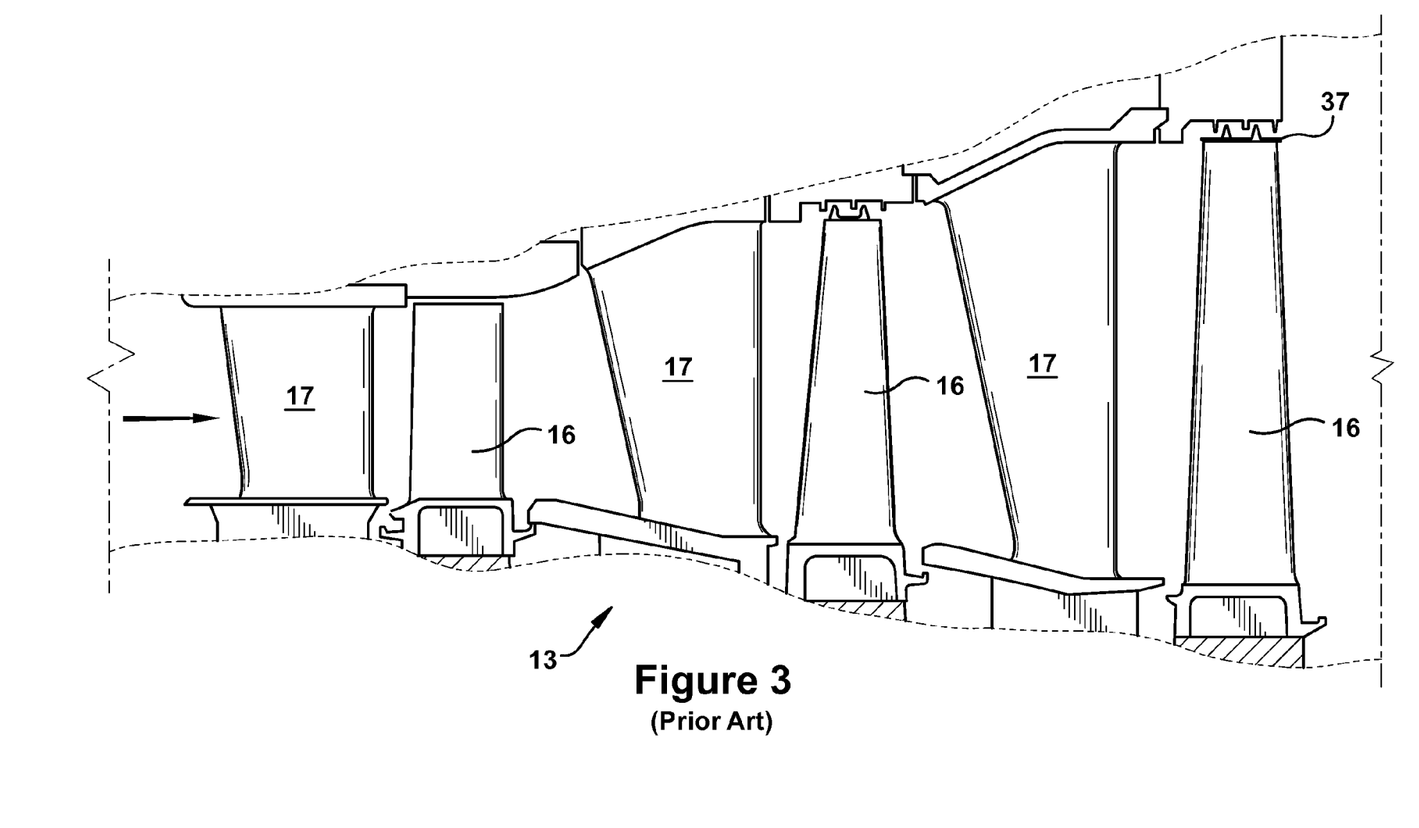
FIG. 3 is a sectional view of the turbine section of the combustion turbine engine of FIG. 1.

FIG. 3 illustrates a partial view of an exemplary turbine section or turbine 13 that may be used in the combustion turbine engine of FIG. 1. The turbine 13 may include a plurality of stages. Three exemplary stages are illustrated, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 13. The direction of flow of the hot gases through the hot gas path is indicated by the arrow. As one of ordinary skill in the art will appreciate, the turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 12, energy may be released when the compressed air is mixed with a fuel and ignited. The resulting flow of hot gases from the combustor 12, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
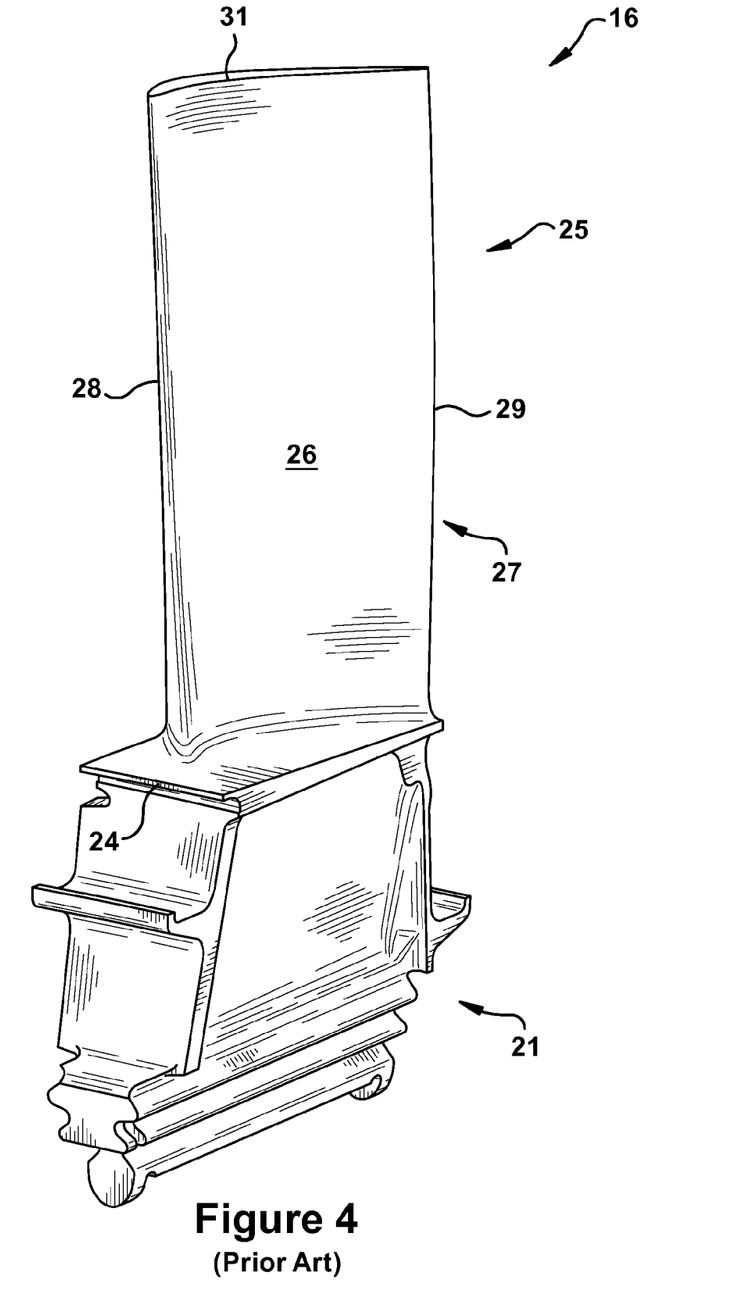
FIG. 4 is a perspective view of a turbine rotor blade of the type in which embodiments of the present invention may be employed.

FIG. 4 is a perspective view of a turbine rotor blade 16 of the type in which embodiments of the present invention may be employed. The turbine rotor blade 16 includes a root 21 by which the rotor blade 16 attaches to a rotor disc. The root 21 may include a dovetail configured for mounting in a corresponding dovetail slot in the perimeter of the rotor disc. The root 21 may further include a shank that extends between the dovetail and a platform 24, which is disposed at the junction of the airfoil 25 and the root 21 and defines a portion of the inboard boundary of the flow path through the turbine 13. It will be appreciated that the airfoil 25 is the active component of the rotor blade 16 that intercepts the flow of working fluid and induces the rotor disc to rotate. While the blade of this example is a turbine rotor blade 16, it will be appreciated that the present invention also may be applied to other types of blades within the turbine engine 10, including turbine stator blades 17. It will be seen that the airfoil 25 of the rotor blade 16 includes a concave pressure side outer wall 26 and a circumferentially or laterally opposite convex suction side outer wall 27 extending axially between opposite leading and trailing edges 28, 29 respectively. The sidewalls 26 and 27 also extend in the radial direction from the platform 24 to an outboard tip 31. (It will be appreciated that the application of the present invention may not be limited to turbine rotor blades, but may also be applicable to stator blades. The usage of rotor blades in the several embodiments described herein is exemplary unless otherwise stated.)

Figure 5:
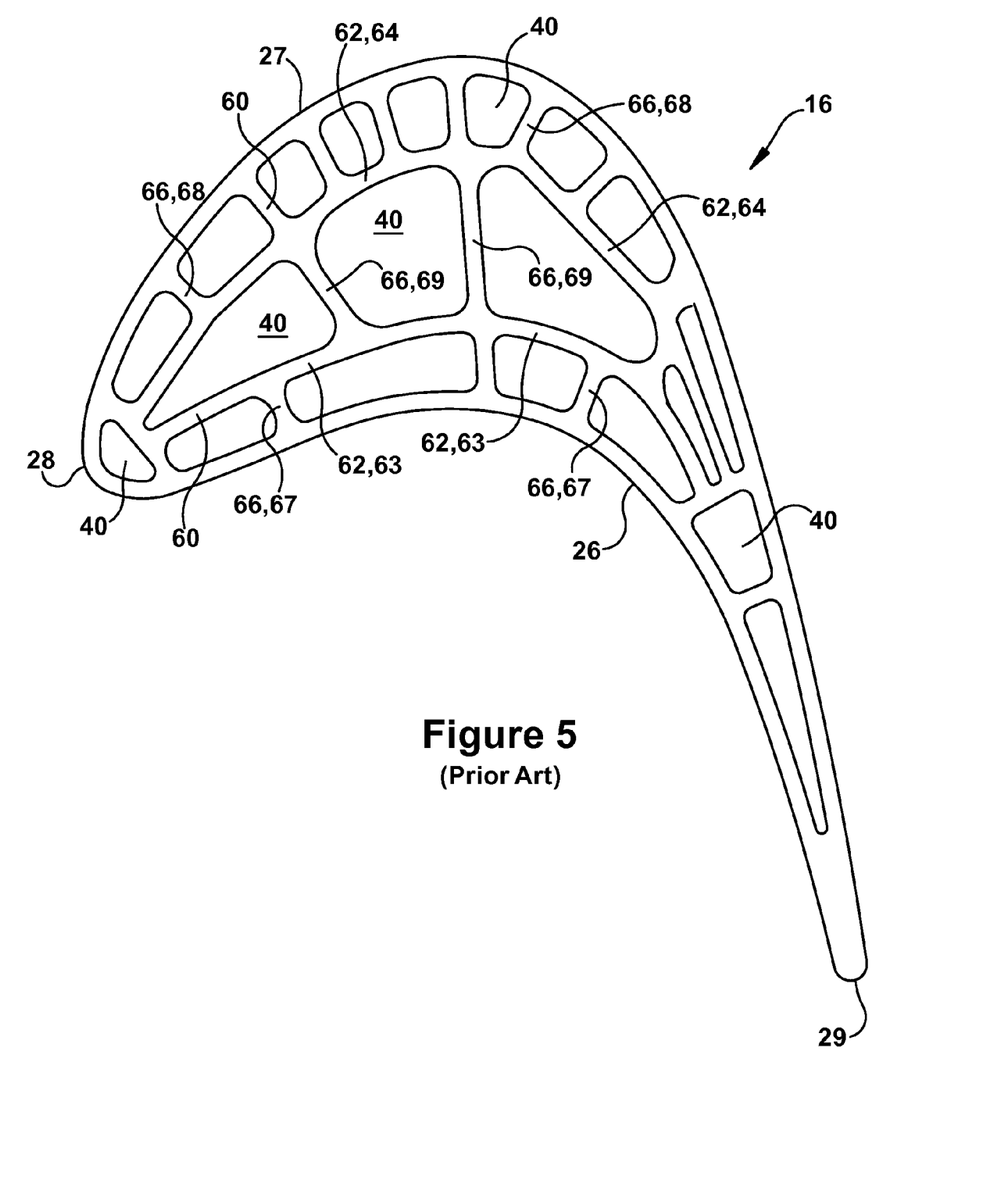
FIG. 5 is a cross-sectional view of a turbine rotor blade having an inner wall or rib configuration according to conventional design.

FIG. 5 shows an internal wall construction as may be found in a rotor blade airfoil 25 having a conventional design. As indicated, the outer surface of the airfoil 25 may be defined by a relatively thin pressure side outer wall 26 and suction side outer wall 27, which may be connected via a plurality of radially extending and intersecting ribs 60. The ribs 60 are configured to provide structural support to the airfoil 25, while also defining a plurality of radially extending and substantially separated flow passages 40. Typically the ribs 60 extend radially so to partition the flow passages over much of the radial height of the airfoil 25, but, as discussed more below, the flow passage may be connected along the periphery of the airfoil so to define a cooling circuit. That is, the flow passages 40 may fluidly communicate at the outboard or inboard edges of the airfoil 25, as well as via a number of smaller crossover passages or impingement apertures (not shown) that may be positioned therebetween. In this manner certain of the flow passages 40 together may form a winding or serpentine cooling circuit. Additionally, film cooling ports (not shown) may be included that provide outlets through which coolant is released from the flow passages 40 onto the outer surface of the airfoil 25.

The ribs 60 may include two different types, which then, as provided herein, may be subdivided further. A first type, a camber line rib 62, is typically a lengthy rib that extends in parallel or approximately parallel to the camber line of the airfoil, which is a reference line stretching from the leading edge 28 to the trailing edge 29 that connects the midpoints between the pressure side outer wall 26 and the suction side outer wall 27. As is often the case, the conventional configuration of FIG. 5 includes two camber line ribs 62, a pressure side camber line rib 63, which also may be referred to as the pressure side inner wall given the manner in which it is offset from and close to the pressure side outer wall 26, and a suction side camber line rib 64, which also may be referred to as the suction side inner wall given the manner in which it is offset from and close to the suction side outer wall 27. As mentioned, this type of design is often referred to as having a "four-wall" configuration due to the prevalent four main walls that include the two sidewalls 26, 27 and the two camber line ribs 63, 64. It will be appreciated that the outer walls 26, 27 and the camber line ribs 62 are cast as integral components.

The second type of rib is referred to herein as a traverse rib 66. Traverse ribs 66 are the shorter ribs that are shown connecting the walls and inner ribs of the four-wall configuration. As indicated, the four walls may be connected by a number of the traverse ribs 66, which may be further classified according to which of the walls each connects. As used herein, the traverse ribs 66 that connect the pressure side outer wall 26 to the pressure side camber line rib 63 are referred to as pressure side traverse ribs 67. The traverse ribs 66 that connect the suction side outer wall 27 to the suction side camber line rib 64 are referred to as suction side traverse ribs 68. Finally, the traverse ribs 66 that connect the pressure side camber line rib 63 to the suction side camber line rib 64 are referred to as center traverse ribs 69.

In general, the purpose of four-wall internal configuration in an airfoil 25 is to provide efficient near-wall cooling, in which the cooling air flows in channels adjacent to the outer walls 26, 27 of the airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such designs are prone to experiencing low cycle fatigue due to differing levels of thermal expansion experienced within the airfoil 25, which, ultimately, may shorten the life of the rotor blade. For example, in operation, the suction side outer walls 27 thermally expands more than the suction side camber line rib 64. This differential expansion tends to increase the length of the camber line of the airfoil 25, and, thereby, causes stress between each of these structures as well as those structures that connect them. In addition, the pressure side outer wall 26 also thermally expands more than the cooler pressure side camber line rib 63. In this case, the differential tends to decrease the length of the camber line of the airfoil 25, and, thereby, cause stress between each of these structures as well as those structures that connect them. The oppositional forces within the airfoil that, in the one case, tends to decrease the airfoil camber line and, in the other, increase it, can lead to further stress concentrations. The various ways in which these forces manifest themselves given an airfoil's particular structural configuration and the manner in which the forces are then balanced and compensated for becomes a significant determiner of the part life of the rotor blade 16.

More specifically, in a common scenario, the suction side outer wall 27 tends to bow outward at the apex of its curvature as exposure to the high temperatures of the hot gas path cause it to thermally expand. It will be appreciated that the suction side camber line rib 64, being an internal wall, does not experience the same level of thermal expansion and, therefore, does not have the same tendency to bow outward. The camber line rib 64 then resists the thermal growth of the outer wall 27. Because conventional designs have camber line ribs 62 formed with stiff geometries that provide little or no compliance, this resistance and the stress concentrations that result from it can be substantial. Exacerbating the problem, the traverse ribs 66 used to connect the camber line rib 62 to the outer wall 27 are formed with linear profiles and generally oriented at right angles in relation to the walls that they connect. This being the case, the traverse ribs 66 operate to basically hold fast the "cold" spatial relationship between the outer wall 27 and the camber line rib 64 as the heated structures expand at significantly different rates. Accordingly, with little or no "give" built into the structure, conventional arrangements are ill-suited at defusing the stress that concentrates in certain regions of the structure. The differential thermal expansion bus results in low cycle fatigue issues that shorten component life.

Many different internal airfoil cooling systems and structural configurations have been evaluated in the past, and attempts have been made to rectify this issue. One such approach proposes overcooling the outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional design in light of how airfoils grow thermally during operation.

The present invention generally teaches certain curving or bubbled or sinusoidal or wavy internal ribs (hereinafter "wavy ribs") that alleviate imbalanced thermal stresses that often occur in the airfoil of turbine blades. Within this general idea, the present application describes several ways in which this may be accomplished, which include wavy camber line ribs 62 and/or traverse ribs 66, as well as certain types of angled connections therebetween. It will be appreciated that these novel configurations—which, as delineated in the appended claims, may be employed separately or in combination—reduce the stiffness of the internal structure of the airfoil 25 so to provide targeted flexibility by which stress concentrations are dispersed and strain off-loaded to other structural regions that are better able to withstand it. This may include, for example, off-loading to a region that spreads the strain over a larger area, or, perhaps, structure that offloads tensile stress for a compressive load, which is typically more preferable. In this manner, life-shortening stress concentrations and strain may be avoided.

Figure 6:
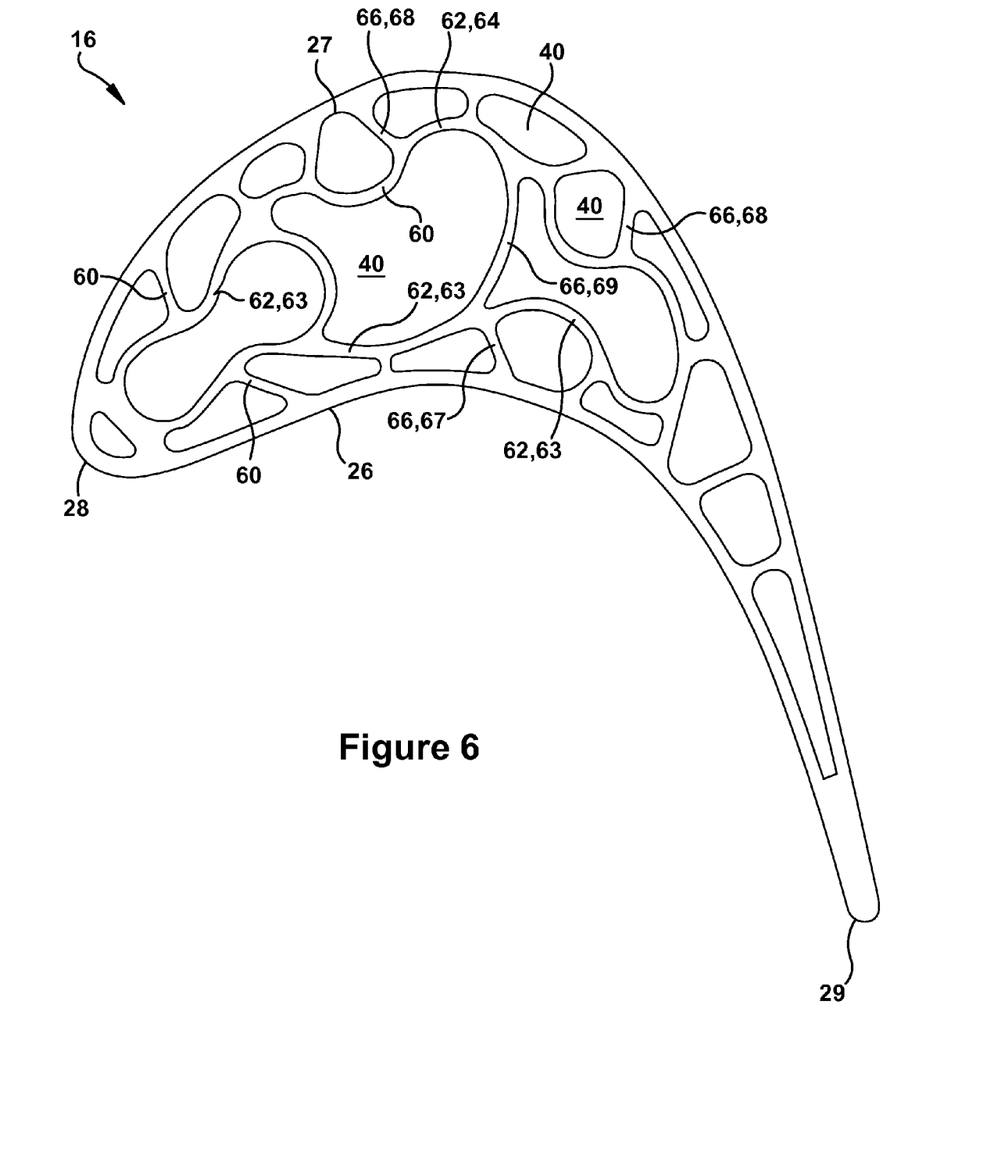
FIG. 6 is a cross-sectional view of a turbine rotor blade having an inner wall configuration according to an embodiment of the present invention.
Figure 7:
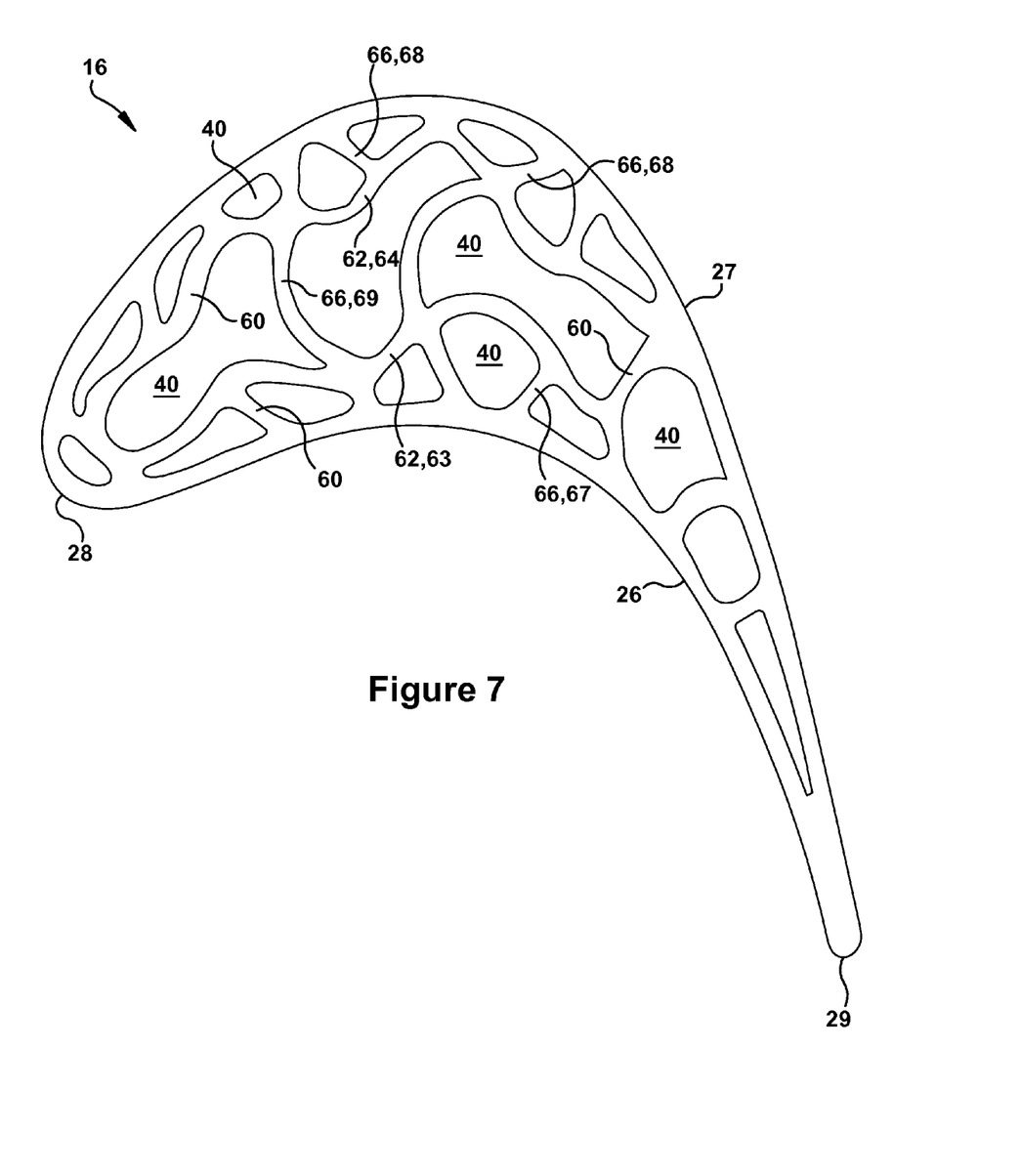
FIG. 7 is a cross-sectional view of a turbine rotor blade having an inner wall or rib configuration according to an alternative embodiment of the present invention.

FIGS. 6 and 7 provide cross-sectional views of a turbine rotor blade 16 having an inner wall configuration according to embodiments of the present invention. Specifically, the present invention involves the configuration of ribs 60 that are typically used as both structural support as well as partitions that divide hollow airfoils 25 into substantially separated radially extending flow passages 40 that may be interconnects as desired to create cooling circuits. These flow passages 40 and the circuits they form are used to direct a flow of coolant through the airfoil 25 in a particular manner so that its usage is targeted and more efficient. Though the examples provided herein are shown as they might be used in a turbine rotor blades 16, it will be appreciated that the same concepts also may be employed in turbine stator blades 17. In one embodiment, the rib configuration of the present invention includes a camber line rib 62 having a wavy profile. (As used herein, the term "profile" is intended to refer to the shape the ribs have in the cross-sectional views of FIGS. 6 and 7.) A camber line rib 62, as described above, is one of the longer ribs that typically extend from a position near the leading edge 28 of the airfoil 25 toward the trailing edge 29. These ribs are referred to as "camber line ribs" because the path they trace is approximately parallel to the camber line of the airfoil 25, which is a reference line extending between the leading edge 28 and the trailing edge 29 of the airfoil 25 through a collection of points that are equidistant between the concave pressure side outer wall 26 and the convex suction side outer wall 27. According to the present application, a "wavy profile" includes one that is noticeably curved and sinusoidal in shape, as indicated. In other words, the "wavy profile" is one that presents a back-and-forth "S" profile. Examples of this particular type of wavy profile are provided above FIGS. 6 and 7.

The segment or length of the camber line rib 62 that is configured with the wavy profile may vary depending on design criteria. In the provided examples the wavy camber line rib 62 typically stretches from a position near the leading edge 28 of the airfoil 25 to a position that is beyond the midpoint of the camber line of the airfoil 25. It will be appreciated that the wavy portion of the camber line rib 62 may be shorter in length while still providing the same types of performance advantages discussed herein. The number of curves as well as the length of the wavy segment of the camber line rib 62 may be varied to achieve the best results. In certain embodiments, the wavy camber line rib 62 of the present invention is defined by the number of complete back-and-forth "S" shapes it contains. In a preferred embodiment of this type, the wavy camber line rib 62 includes at least one continuous back-and-forth "S" shape. In another embodiment, the wavy camber line rib 62 includes at least two consecutive and continuous back-and-forth "S" shapes. It will be appreciated that the examples provided in FIGS. 6 and 7 each trace paths having more than two full "S" shapes. In regard to overall length, the wavy segment of the camber line rib 62 may extend for a substantial portion of the length of the camber line of the airfoil 25. For example, as shown in FIGS. 6 and 7, in a preferred embodiment, the wavy portion of the camber line rib 62 is over 50% of the length of the camber line of the airfoil 25. In other words, the wavy portion of the camber line rib 62 originates near the leading edge 28 of the airfoil 25 and extend rearward and well beyond the apex of the curvature of the airfoil 25. It will be appreciated that shorter lengths also may be employed with performance benefits, such as wavy portions of at least 25% length of the camber line rib 62.

It will be appreciated that, given its winding profile, a wavy camber line rib 62 traces a path that varies in its directional heading. The wavy camber line rib 62 of the present invention may still be described as having a general arcing path across which it winds, and that this path typically extends from an origination point near the leading edge 28 and a trailing point near the trailing edge 29 of the airfoil 25. It will be appreciated that, in the case of a wavy camber line rib 62, it is this general arcing path that is roughly parallel to the camber line of the airfoil 25.

Many known airfoil 25 configurations, such as the four-wall example of FIG. 5 discussed above, include two camber line ribs 62. This type of configuration may be described as having a pressure side camber line rib 63 that resides nearer the pressure side outer wall 26, and a suction side camber line rib 64 that resides nearer the suction side outer wall 27. The present invention, as shown in FIGS. 6 and 7, may include configurations in which both the suction side camber line rib 64 and the pressure side camber line rib 63 are formed as wavy ribs. In alternative embodiments, only one of these camber line ribs 62 may have a wavy profile. It will be appreciated that the present invention may also be employed in configurations having only a single camber line rib 62.

In airfoils 25 that include two camber line ribs 62, it will be appreciated that the pressure side camber line rib 63 and the suction side camber line rib 64 define a center flow passage 40. The wavy profile for each of the pressure side camber line rib 63 and the suction side camber line rib 64 may be defined relative to the shape taken by successive segments of the camber line rib 62 facing center flow passage 40. That is, for example, relative to the central flow passage 40, the wavy profile of the camber line rib 62 may be described as including two successive segments in which a first concave segment transitions to a second convex segment. In an alternative embodiment, the wavy profile may include four or more successive segments in which: a first concave segment transitions to a second convex segment; the second convex segment transitions to a third concave segment; and the third concave segment transitions to a fourth convex segment.

According to aspects of the present invention, the internal structure of an airfoil may include wavy ribs along the camber line direction of the airfoil. By making the camber line rib 62 into a spring in this way, the internal backbone of the airfoil may be made more compliant so that performance advantages may be achieved. In addition, the traverse ribs of the airfoil structure may be curved so to further soften the load path, as well as making more compliant connections with the ribs 62 and outer walls 26, 27 that they connect. Whereas standard linear rib designs experience high stress and low cyclic life due to the thermal fight between the internal cooling cavity walls and the much hotter outer walls, the present invention provides a spring-like construction that is better able to disburse stress concentrations, which, as provided herein, may be used to improve the life of the component.

Figure 8:
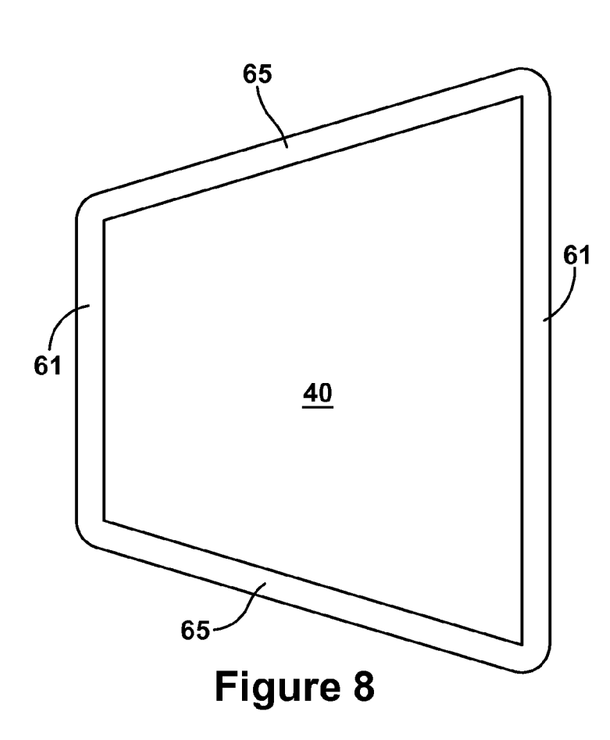
FIG. 8 is a cross-sectional view of one of the flow passage of FIG. 5 according to aspects of the present invention.
Figure 14:
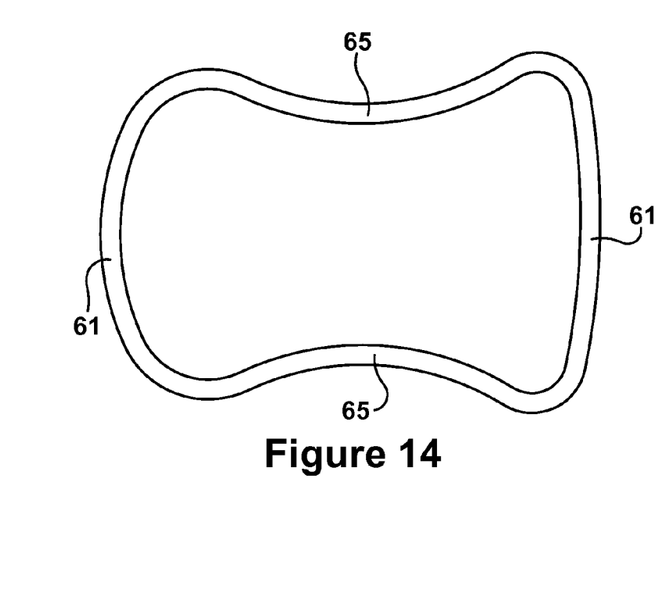
FIG. 14 is a cross-sectional view of one of the flow passage of FIG. 7 according to aspects of the present invention.
Figure 15:
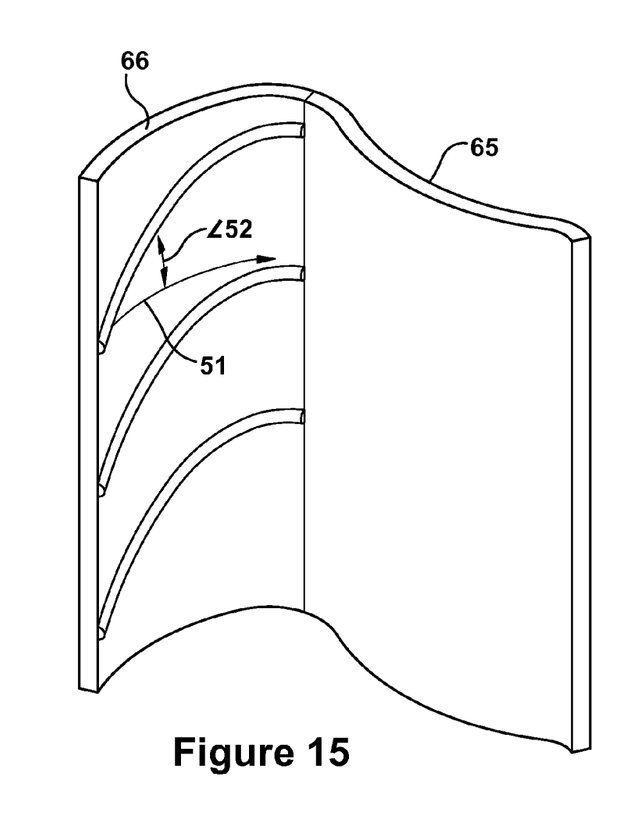
FIG. 15 is a perspective view of two adjacent walls of the flow passage of FIG. 14 according to aspects of the present invention.

Turning to another aspect of the present invention, reference is made to FIGS. 8 through 15. It will be appreciated that FIGS. 8 and 14 illustrate cross-sectional views of single flow passages 40 that, respectively, may be found in FIGS. 5 and 7, which are discussed above. The other figures, FIGS. 9 through 13, and 15, provide several embodiments according to the present invention regarding how turbulators 50 may be arranged on the walls of flow passages 40 so to enhance internal cooling systems of airfoils 25.

Figure 9:
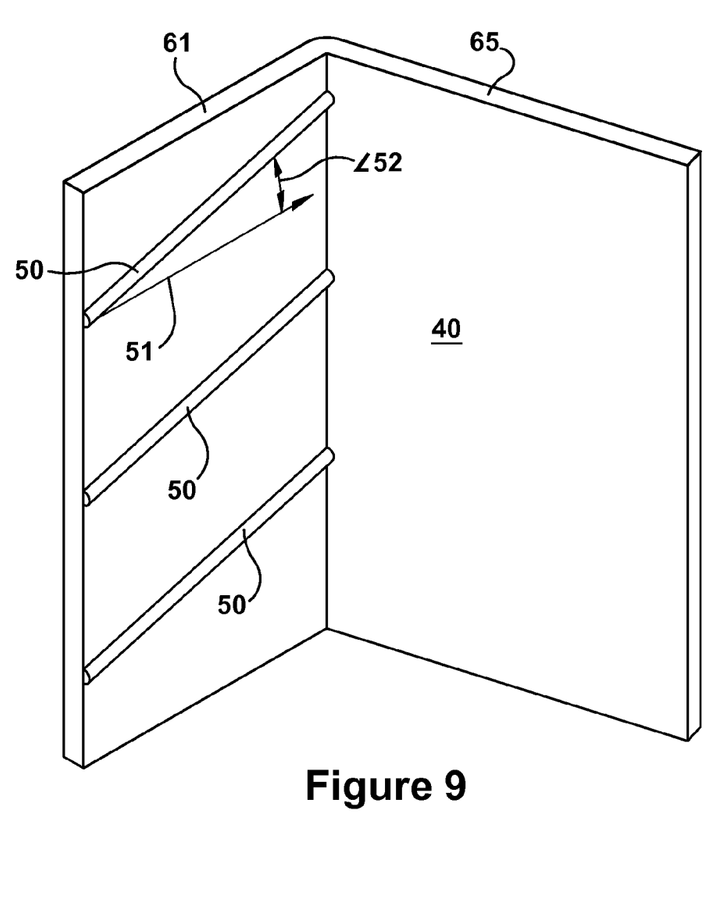
FIG. 9 is a perspective view of two adjacent walls of the flow passage of FIG. 8 according to aspects of the present invention.
Figure 10:
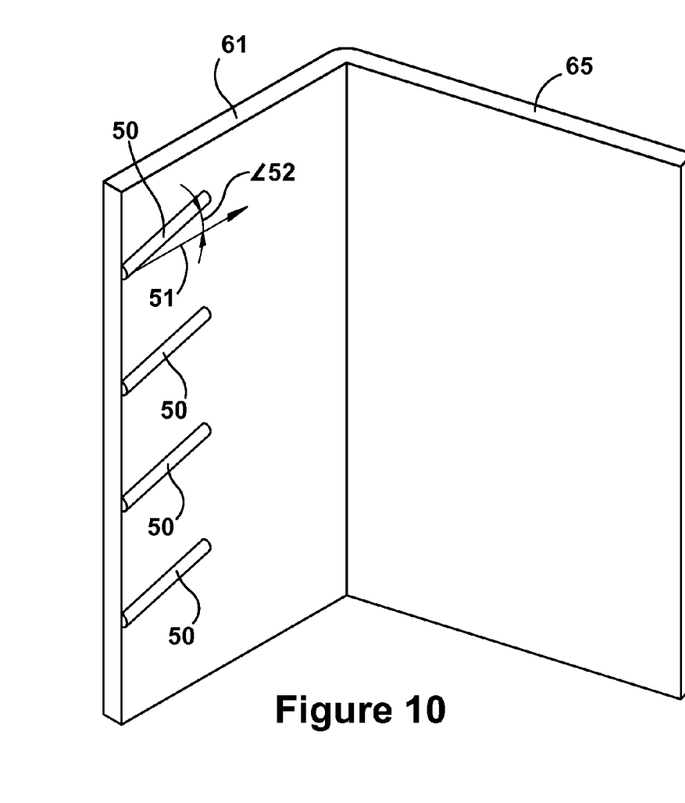
FIG. 10 is a perspective view of two adjacent walls of the flow passage of FIG. 8 according to an alternative embodiment of the present invention.

According to a first embodiment, a flow passage 40, such as the one shown in FIGS. 8 and 14, may include an arrangement of turbulators 50 that have a canted configuration, such as the embodiment provided in FIG. 9. As used herein, turbulators 50 are elongated, steep-sided protrusions that are used to induce turbulent flow and thereby enhance heat exchange in cooling passages, such as those flow passages, my used in the airfoils 25 of turbine blades 16. It will be appreciated that turbulators 50 may take a variety of configurations. In a preferred embodiment, turbulators 50 may have a semicircular or semi-oval cross-sectional shape.

As shown in the cross-sectional views of FIGS. 8 and 14, flow passages 40 typically include radially extending and opposing pairs of sides. This arrangement is particularly common in airfoils 25 that have a winding or sinusoidal coolant path that extends back-and-forth between an inboard end and the outboard tip 31 of the airfoil 25. For the sake of illustration, the flow passage 40 of FIG. 8 is simplified in FIGS. 9 through 12 and 15 to include a first side 61 and an adjacent second side 65. It will be appreciated that each of the adjacent sides 61, 65 (as shown in FIG. 8) may be opposed across the flow passage 40 by a side 61, 65 of the same type. Thus, for example, the first side 61 and the side shown opposing it in FIGS. 8 and 14 may represent a pair of camber line ribs 62 or, in another case, may represent a camber line rib 62 and one of the outer walls 26, 27 of the airfoil 25. As discussed above, as any of these possibilities represent a common internal configuration used in airfoils 25. To take the example further, it will be appreciated that the second side 65 and the side shown opposing it in FIGS. 8 and 14, in this case, would represent traverse ribs 66. Accordingly, in regard to the embodiments of the present invention described below that reference the simplified two-sided illustrations, it should be understood that the sides opposite the ones illustrated 61, 65, unless otherwise stated, may have any type of an arrangement of turbulators 50, or include none at all. Additionally, the arrangement of turbulators 50 on the sides not shown, in some instances, may have an arrangement of turbulators 50 that mirrors the arrangement of the side opposite it, or one that alternates radially or laterally relative to the arrangement of side opposite it, or one that includes an arrangement of turbulators 50 unrelated to the one opposite it. As also provided below, the arrangement of turbulators 50 on the sides 61, 65 may relate to the arrangement on an adjacent side. Certain embodiments of the present invention, however, describe an arrangement of turbulators 50 that occurs on only one of the sides 61, 65 of the flow passage 40.

As indicated in FIGS. 9 through 13 and 15, the canted configuration of the turbulators 50 may be defined by an acute angle 52 each forms relative to a particular reference line 51. The reference line 51, according to the present invention, may be one that extends across one of the sides 61, 65 of the flow passage 40 while maintaining an approximately constant radial height. It will be appreciated that such a reference line 51 may be formed at any location on the sides 61, 65 so that a reference line 51 so derived is applicable any turbulator 50. In preferred embodiments, the canted configuration of each turbulator 50 is one in which the turbulator 50 and the reference line 51 form an acute angle 52 of at least 20 degrees. In an alternative embodiment, the canted configuration includes turbulators 50 that form an acute angle 52 of at least 40 degrees with one of the reference lines 51. In a preferred embodiment, the turbulators 50 are radial spaced along the length of the flow passage 40. As indicated, the radial spacing between turbulators 50 may be regular in certain preferred embodiments. Additionally, the arrangement of turbulators 50 on one of the sides 61, 65 or between two or more of the sides 61, 65 may have a parallel configuration with respect to each other. In this case, it will be appreciated that each turbulator 50 forms approximately the same acute angle 52 with the reference line 51.

In preferred embodiments many several turbulators may be provided along any of the sides 61, 65 of the flow passage 40. Preferably, at least five turbulators 50 are included on a side 61, 65 of the flow passage 40. More or less turbulators 50 also may be provided. These turbulators 50 may be spaced so to cover all, most or targeted areas of the flow passage 40 between the passage's inboard end, which may be located near the inboard end of the airfoil 25, and the passage's outboard end, which may be located near the outboard tip 31 of the airfoil.

Figure 11:
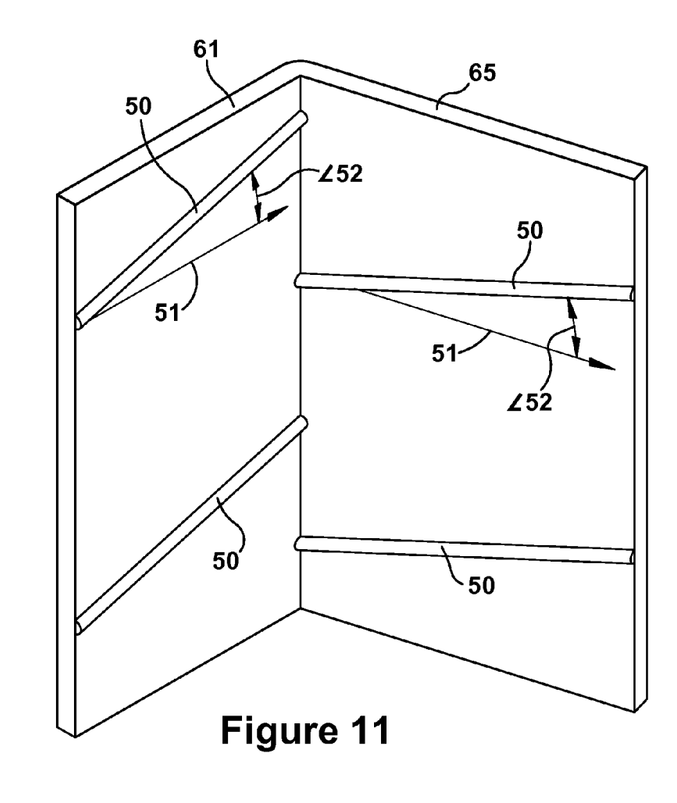
FIG. 11 is a perspective view of two adjacent walls of the flow passage of FIG. 8 according to an alternative embodiment of the present invention.
Figure 12:
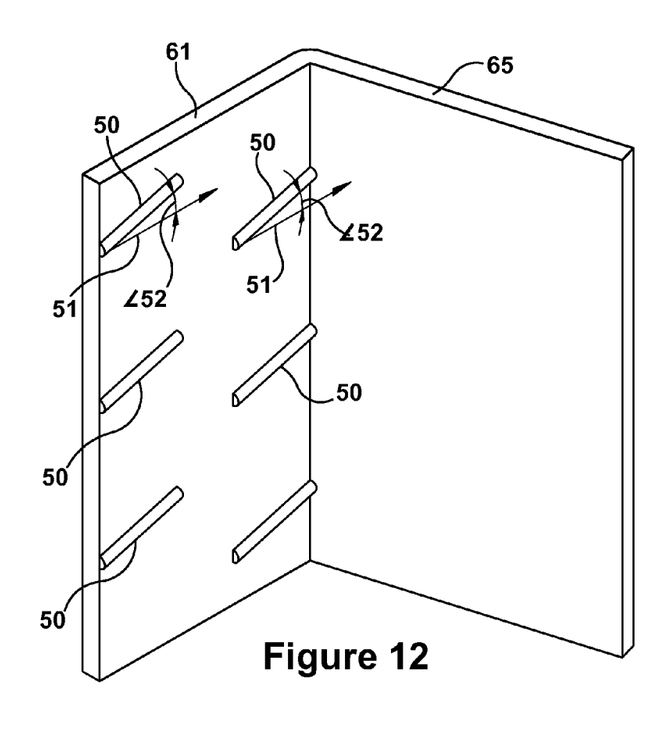
FIG. 12 is a perspective view of two adjacent walls of the flow passage of FIG. 8 according to an alternative embodiment of the present invention.
Figure 13:
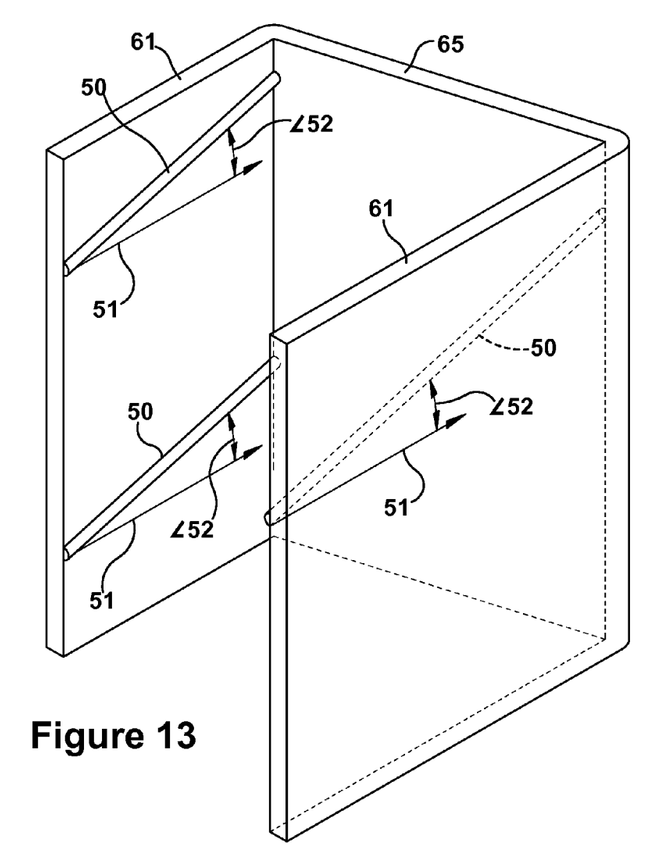
FIG. 13 is a perspective view of three adjacent walls of the flow passage of FIG. 8 according to an alternative embodiment of the present invention.

According to one embodiment, as shown in FIGS. 9 and 11, each of the turbulators 50 may extend uninterrupted (and canted) across the entire width of the first side 65 (or in the case of FIG. 11, across the entire width of the first and second sides 61, 65) of the flow passage 40. In another embodiment, as provided in FIGS. 10 and 12, the turbulators 50 may extend a partial distance across a width of either of the sides 61, 65 of the flow passage 40. These partial turbulators 50 may be arranged, as indicated, such that their cross-sectional profile aligns, such as in the embodiment shown in FIG. 10. Alternatively, in another embodiment, the partial turbulators 50 may have a laterally alternated configuration, such as the embodiment shown in FIG. 12. As described, it will be appreciated that opposing sides of the flow passage 40 may have turbulators 50 that approximately mirror each other, or may have an arrangement of turbulators 50 that is different or similar to any of the other ones described herein. Additionally, embodiments of the present invention include turbulators 50 formed on only one side 61, 65 of the flow passage 40, or any combination of the multiple sides 61, 65 of the flow passage 40. The turbulators 50 on an opposing sides 61, 65 may be configured to alternate radially with each other, as provided in FIG. 13, which includes a perspective view of three sides 61, 65 of the flow passage 40 shown in FIG. 8.

According to one preferred embodiment of the present invention, the side 61 of the flow passage 40 represents a traverse rib 66 and, as shown in FIG. 9, includes a number of the canted turbulators 50. In this case, the side 61/traverse rib 66 may extend across the camber line of the airfoil 25, examples of which are shown are found in the center traverse ribs 69 of FIGS. 5 through 7. According to embodiments of the present invention, such traverse ribs 66 may include turbulators 50 that have a canted configuration. According to a preferred embodiment, the turbulators 50 having the canted configuration also extend across the camber line of the airfoil 25. As will be appreciated by one of ordinary skill in the art, one reason that this particular configuration is novel is due to a manufacturing limitation that argued against its formation. Accordingly, canted turbulators 50 of the present invention preferably are positioned on a center traverse rib 69. As described, a center traverse rib 69 is a structural support that extends between a pressure side camber line rib 63 and a suction side camber line rib 64, and which typically extends through the camber line of the airfoil 25 such that turbulators 50 similar to those of FIG. 9 also extend through the camber line of the airfoil 25.

In operation, the turbulators 50 cause the flow through a cooling passage 40 to be a turbulent one, which increases the heat transfer coefficient and thus the convective benefit of the coolant against the hot surfaces of the passage. Conventional technologies failed to include turbulators 50 in certain areas due to manufacturing limitations that argued against their inclusion. The present invention involves extending the benefit of turbulators 50 throughout the internal passages 40 of airfoils 25 so to increase the efficiency of coolant usage and, thereby, more generally increase the overall efficiency of the turbine engine. The present invention may further be used as a way to address localized thermal gradients that are often detrimental to the life of the turbine blade. The turbulators 50 may be employed to promote even cooling of the airfoil's internal region and lessen the strain that occurs when such regions are thermally imbalanced. It will be appreciated that the fight due to this type of thermal imbalance in the airfoil structure, particularly between internal near-wall cooling cavities and the more centrally located passages, results in strain that often concentrates in the structure that connects these two areas, which often is the shorter traverse ribs. It will be appreciated that the turbulators 50 of one of the preferred embodiments of the current application may be used to reduce thermal gradients in traverse ribs and thereby improves the cyclic life of the component. Further, it will be appreciated that turbulators 50 described herein may be used to tune the cooling system of turbine blades and reduce problematic thermal gradients in targeted areas.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A turbine blade comprising an airfoil defined by a concave shaped pressure side outer wall and a convex shaped suction side outer wall that connect along leading and trailing edges and, therebetween, form a radially extending chamber for receiving the flow of a coolant, the turbine blade further comprising:
    a rib configuration that partitions the chamber of the airfoil into radially extending flow passages;
    wherein a first flow passage includes a first side on which turbulators are positioned, wherein each of the turbulators comprises a canted configuration;
    wherein the canted configuration comprises each of the turbulators being canted relative to a reference line on the first side that has a constant radial height;
    wherein the canted configuration of the turbulators comprises an acute angle of at least 20 degrees being formed between each of the turbulators and one of the reference lines;
    wherein the first flow passage is defined by radially extending sides that include: a second side that is opposite the first side, and two additional sides, a third side and a fourth side, that flank the first side and extend adjacent thereto;
    wherein each of the turbulators comprises an elongated, steep-sided protrusion;
    wherein the first side comprises a traverse rib; and
    wherein the traverse rib and the turbulators are configured to extend through a camber line of the airfoil.

2. The turbine blade according to claim 1, wherein the canted configuration of the turbulators comprises an acute angle of at least 40 degrees being formed between each of the turbulators and one of the reference lines.

3. The turbine blade according to claim 1, wherein each of the turbulators extends uninterrupted across a width of the first side of the flow passage;
    wherein the first side comprises at least 5 turbulators radially spaced between an inboard end and an outboard end of the first side; and
    wherein the turbulators comprise a parallel configuration.

4. The turbine blade according to claim 1, wherein each of the turbulators extends partially across a width of the first side of the flow passage;

wherein the first side comprises at least 5 turbulators radially spaced between an inboard end and an outboard end of the first side; and wherein the turbulators comprise a parallel configuration.

5. The turbine blade according to claim 1, wherein each of the turbulators extend partially across the first side; and wherein the first side comprises at least 5 turbulators that include a regular radial spacing between a first turbulator positioned near an inboard end of the first side and a tenth turbulator near an outboard end of the first side; and wherein the turbulators are laterally alternated.

6. The turbine blade according to claim 1, wherein the second side comprises turbulators configured to approximately mirror the turbulators on the first side.

7. The turbine blade according to claim 1, wherein the second side comprises turbulators configured as the turbulators on the first side; and wherein the turbulators on the second side are configured to alternate radially with the turbulators on the first side.

8. The turbine blade according to claim 1, wherein the second side comprises turbulators that are canted relative to a reference line on the second side that has a constant radial height;

wherein the turbulators on the second side each comprises an elongated, steep-sided protrusion; and wherein the canted configuration of the turbulators on the second side comprises an acute angle of at least 20 degrees being formed between each of the turbulators and one of the reference lines.

9. The turbine blade according to claim 1, wherein the second side comprises turbulators having a canted configuration;

wherein the turbulators on the second side are canted relative a reference line on the second side that has a constant radial height such that an acute angle of at least 20 degrees is formed between each of the turbulators and one of the reference lines on the second side;

wherein the second side comprises at least 5 turbulators radially spaced between an inboard end and an outboard end of the second side; and wherein the turbulators of the second side comprise a parallel configuration.

10. The turbine blade according to claim 9, wherein the turbulators of the first and the second sides are radially alternated.

11. The turbine blade according to claim 9, wherein the second side comprises one of a camber line rib, a pressure side outer wall, and a suction side outer wall of the airfoil.

12. The turbine blade according to claim 9, wherein the second side comprises a traverse rib.

13. The turbine blade according to claim 1, wherein the third side comprises turbulators having a canted configuration; and wherein the turbulators on the third side are canted relative a reference line on the third side that has a constant radial height such that an acute angle of at least 20 degrees is formed between each of the turbulators and one of the reference lines on the third side.

14. The turbine blade according to claim 13, wherein the third side comprises at least 5 turbulators radially spaced between an inboard end and an outboard end of the third side; and wherein the turbulators of the third side comprise a parallel configuration; and wherein the turbulators of the first and third sides are radially alternated.

15. The turbine blade according to claim 13, wherein one of the second side, the third side, and the fourth side comprises a segment of a camber line rib having a wavy profile;

wherein the wavy profile includes one having at least one back-and-forth "S" shape; and wherein the turbine blade comprises a turbine rotor blade.

16. The turbine blade according to claim 1, wherein the second side, the third side, and the fourth side comprise turbulators having a canted configuration;

wherein the turbulators on the second side are canted relative a reference line on the second side that has a constant radial height such that an acute angle of at least 20 degrees is formed between each of the turbulators and one of the reference lines on the second side;

wherein the turbulators on the third side are canted relative a reference line on the third side that has a constant radial height such that an acute angle of at least 20 degrees is formed between each of the turbulators and one of the reference lines on the third side; and wherein the turbulators on the fourth side are canted relative a reference line on the fourth side that has a constant radial height such that an acute angle of at least 20 degrees is formed between each of the turbulators and one of the reference lines on the fourth side.

* * * * *